Figure 3:
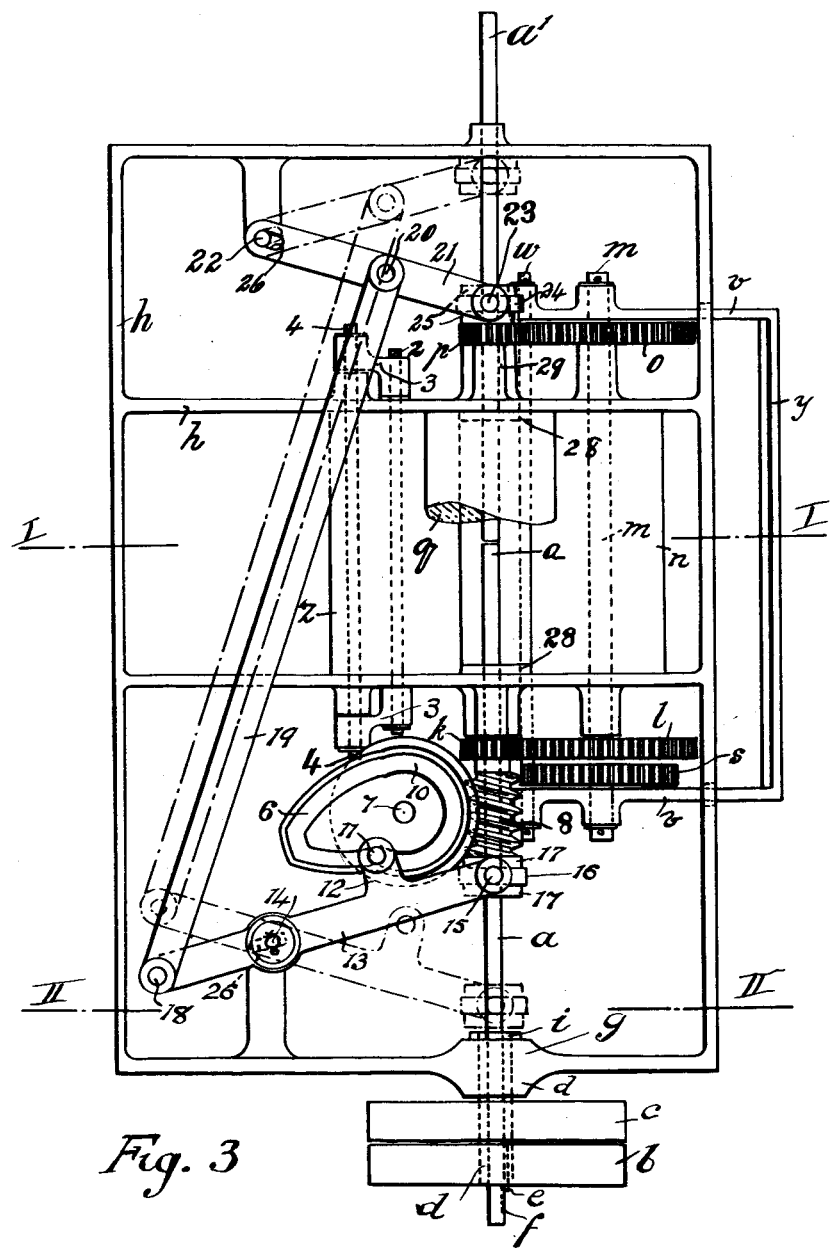

L. EMBREY.
METHOD OF TREATING DOUGH.
APPLICATION FILED AUG. 6, 1914.
1,179,294.
Patented Apr. 11, 1916.
2 SHEETS—SHEET 1.
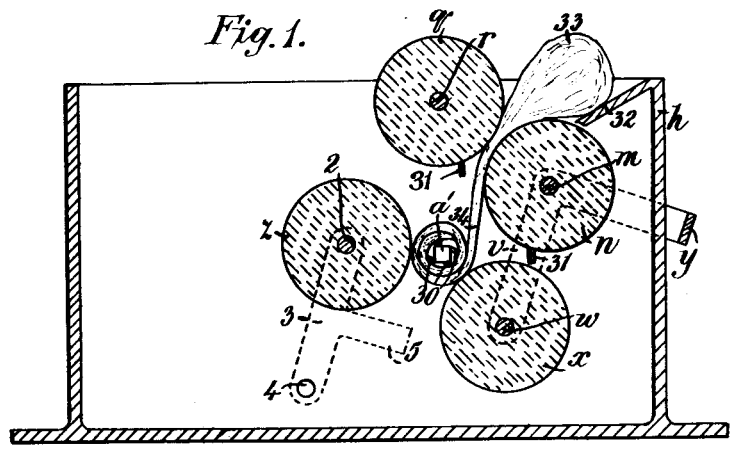
Fig. 1.
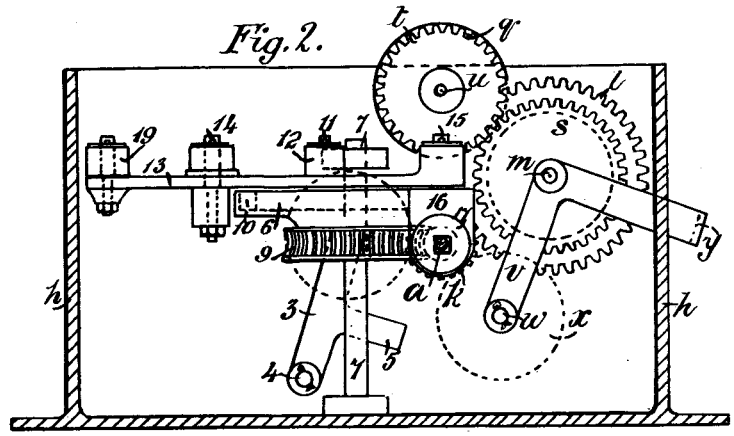
Fig. 2.
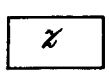    
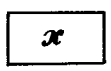    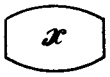
Fig. 4.   Fig. 5.   Fig. 6.   Fig. 7.   Fig. 8.
Witnesses
J. M. Meyer
Floyd R. Cornwall
Inventor
L. Embrey
by Jno. Imrie Attorney

UNITED STATES PATENT OFFICE.

LAURENCE EMBREY, OF COUNTY OF STAFFORD, ENGLAND.

METHOD OF TREATING DOUGH.

1,179,294.     Specification of Letters Patent.     Patented Apr. 11, 1916.

Application filed August 6, 1914. Serial No. 855,469.

*To all whom it may concern:*

Be it known that I, LAURENCE EMBREY, subject of the King of Great Britain, residing in Staffordshire, England, have invented a certain new and useful Improved Method of Treating Dough, of which the following is a specification.

This invention relates to an improved method of treating dough used for the making of loaves, rolls and like bread, that is to say dough containing in addition to the flour, water and salt, a ferment, such as yeast, or what is known in the bakery trade as sponge. The dough is prepared in any usual way by mixing flour, water and ferment, and is then allowed to stand for some time till it is "ready", that is to say until the ferment has grown to some considerable extent. The action of the ferment is to form a cellular structure, the contents of the cells being moisture and gas and the walls of the cells being formed principally of gluten. To facilitate the formation of these cell walls and increase their number I have found that the gluten should be well stretched without puckering.

According to this invention the gluten of dough containing a ferment is stretched by applying tension to a piece of dough from within the mass thereof. The method preferably employed is to coil the dough around a central spindle.

The treatment of dough in the process known as "molding" has hitherto embodied a kneading operation in which rollers or other moving members have applied pressure to the exterior of a mass or clot of dough. This kneading or external working of the mass has been effected most successfully by hand, and with a skilful operator satisfactory results may be obtained. Mechanical means have also been tried but so far as I am aware they all act externally on the dough. The beneficial effect of kneading is that the gluten is stretched and in this stretched state, it facilitates the formation of cells during the process of proving. It is thus of importance to stretch the gluten and keep it stretched during proving. In other words there must be no puckering of the dough as this does not produce light palatable bread.

According to this invention I impart a permanent stretch to the dough and avoid all puckering.

The invention may be applied by mechanical means and will be here described with reference to the accompanying drawings in which:

Figures 1 to 3 illustrate one form of machine for stretching and shaping dough in small pieces, such as used in the making of loaves, rolls or the like. Figs. 1 and 2 are sectional elevations on the lines I—I, II—II, Fig. 3 which is a plan, from which however, some parts are omitted for sake of clearness. Figs. 4 to 8 illustrate suitable forms of guide or shaping rollers which may be used.

In carrying out the invention according to one mode, for instance in the treating of dough in small pieces ready for making loaves, rolls or the like, a rotating spindle is adapted for the moving member which is to engage with and stretch the dough. This spindle in the example illustrated in Figs. 1 to 3 is conveniently made in two contiguous parts $a$ $a'$. The part $a$ is rotated by a fast pulley $b$ which together with a loose pulley $c$, is carried by a sleeve $d$ on the end of the spindle $a$, the latter having a keyway $f$ in which slides a key $e$ fixed in the sleeve $d$ so that although the spindle $a$ may be reciprocated in the sleeve it is bound to rotate with the same. The sleeve $d$ is conveniently supported in a boss $g$ in the main frame $h$ and has a retaining collar $i$. The part $a'$ of the spindle is rotated at the same speed as the part $a$ through the medium of toothed wheels $k$, $l$, $o$ and $p$. The wheels $k$ and $p$ are provided with bores of square cross section so that they are caused to rotate with the respective parts $a$ $a'$ of the spindle, which except in the case of the outer portion of the part $a$ are of square cross section. The toothed wheels $l$ and $o$ are mounted on the spindle $m$ of a roller $n$, the spindle being carried by the frame $h$. A toothed wheel $s$ also on the spindle $m$ meshes with a toothed wheel $t$ on the spindle $u$ of another roller *q*. Part of the roller *q* and the wheel *t* are omitted in Fig. 3 for sake of clearness. A pair of levers *v* pivoted freely on the spindle *m* and connected by a cross bar *y* forming a counterweight, carry a spindle *w* for a freely rotatable guide roller *x*. A similar freely rotatable guide roller *z* is mounted on a spindle 2 carried by a pair of levers 3 pivoted at 4, 4, and provided with a counterweight 5.

The two parts *a a'* of the winding spindle are adapted to be periodically moved away from and toward each other by means of a cam 6, mounted on a spindle 7, rotated by a worm 8 through which the spindle *a* can slide, the worm engaging with a worm wheel 9. A slot 10 in the cam receives a pin 11 carried by an extension 12 on a lever 13 having a fulcrum 14. One end of the lever 13 engages with a pin 15 carried by a plate 16 held between two collars 17, 17 secured to the part *a* of the winding spindle. A link 19 is connected at 18 to the lever 13 and at 20 to a lever 21 pivoted at one end 22 and engaging at its other end with a pin 23 carried by a plate 24 held between two collars 25, 25, fixed on the part *a'* of the spindle. The levers 13 and 21 are slotted at 26 adjacent to their fulcrum so that when the cam 6 rotates, the levers are free to move together outwardly and inwardly periodically to move the parts *a a'* of the winding spindle away from and toward each other.

The operation of the machine above described is as follows: A piece of dough 33 placed on a sloping table 32 is fed by the rollers *n q* in the form of a strip 34 which is either directly engaged by grippers 30 on the spindle *a a'* or is guided thereon by the roller *x*. The feeding rollers *n q* are preferably of unglazed porcelain, biscuit ware or like material to which the dough is not likely to adhere, but to avoid adherence of the strip, scrapers 31, 31 may be provided. When the winding spindle *a a'* engages with the strip it winds it up as indicated in Fig. 1, and thereby applies tension to the strip from within outward, that is to say, the whole of the gluten both within and on the outer layers of the dough is stretched. The freely rotatable rollers *x* and *z* are lightly pressed back by the dough against the action of their counterweights, so that they apply sufficient pressure to prevent any slackness or puckering of the dough or in other words, help to maintain the dough under tension. Any desired number of these tension rollers may be used. In order that they may be held out of contact with the bar when no dough is thereon, suitable stops are provided to limit their inward movement, the stops being conveniently in the form of friction wheels 28, 28, with which the rollers engage, the diameter of these wheels being approximately equal to that of the greatest diameter of the path described by the grippers 30 so that contact with the grippers is just avoided. The rollers *x x* may be of any desired shape or form in order that they may be used to shape the dough wound on the bar, for instance, any of the forms indicated in Figs. 4 to 8 may be adopted for them. When the strip has been totally wound, the cam 6 and connected mechanism before described, withdraws the parts *a a'* so that the wound and stretched dough is released and may fall on to a table to be removed by hand, or on to a chute, conveyer or the like, the spindle parts *a a'* in the meantime being returned.

By an apparatus such as above described tension is applied to the whole of the gluten in the dough, that is to say the tension is applied to the interior of the dough as well as the exterior.

By winding dough in the manner described without or with the application of a light exterior pressure by means of movable rollers, a constant tension is maintained throughout the dough, in contradistinction to the effect produced by known devices in which a moving hand is used with the intention of rolling a piece of dough on a stationary surface, in which case the stationary surface produces a lag on the dough, while the moving band applied to the opposite part or section thereof presses the same forward and causes buckling or puckering of the dough so that no tension is actually applied to the interior thereof and the resulting loaf when baked is defective. The light external pressure upon the dough during coiling causes the stretched superposed layers to adhere to one another and thereby the tension in the dough is maintained.

I claim:

1. The method of treating dough containing ferment which consists in forming the dough into a strip, coiling said strip under tension around a central spindle to apply tension to the dough from within the mass thereof, and then leaving the ferment to act upon the dough so stretched.

2. The method of treating dough containing ferment which consists in forming the dough into a strip, winding said dough on a spindle by a rotary movement of the spindle, separating the wound dough and spindle by a relative axial movement and proving the dough so wound.

3. The method of treating dough to assist proving which consists in forming said dough into a strip, coiling said strip around a spindle, whereby tension is applied to the dough from within the mass, and applying a light external pressure to cause superposed layers of the coil to adhere and thereby maintain the dough in tension.

4. The method of treating dough to assist proving which consists in forming said dough into a strip, coiling said strip around a spindle, whereby tension is applied to the dough from within the mass, applying a light external pressure to cause superposed layers of the coil to adhere and thereby maintain the dough in tension, and finally shaping the tension mass t form a loaf.

In testimony whereof I have signed my name to this specification in the presence of two subscribing witnesses.

LAURENCE EMBREY.

Witnesses:
 VINCENT FLACKETT,
 FRANK MADSLEY.